— WITH D.C. SYSTEM $P_d$=5KW $\Delta P_d$=1.5KW
---- WITHOUT D.C. SYSTEM

INVENTOR.
TAKEHIKO MACHIDA
BY
H. Edward Masters

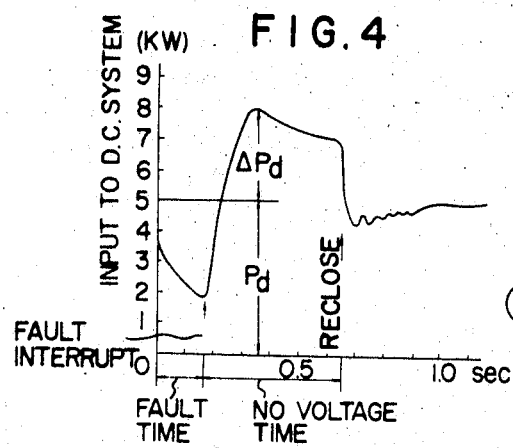
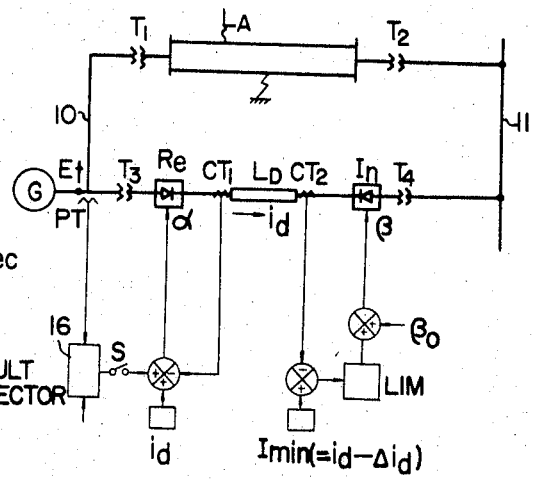
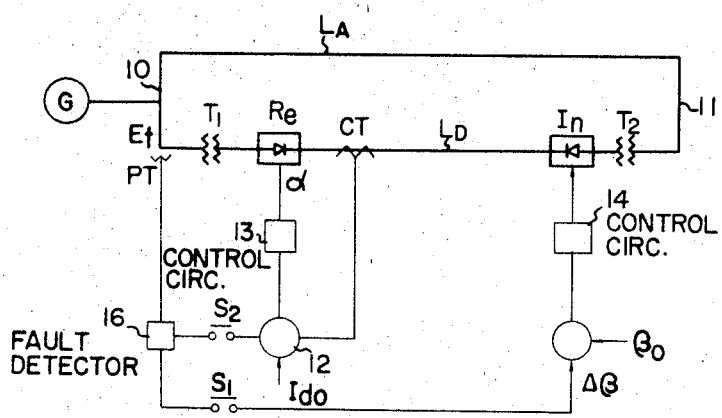

United States Patent Office 3,437,878
Patented Apr. 8, 1969

3,437,878
CONTROL SYSTEM FOR IMPROVING TRANSIENT STABILITY OF A.C. SYSTEM BY JOINT USE OF D.C. SYSTEM
Takehiko Machida, Tokyo-to, Japan, assignor to Zaidan Hojin Denryoku Chuo Kenkyusho, Tokyo-to, Japan
Filed Sept. 13, 1965, Ser. No. 486,609
Claims priority, application Japan Mar. 8, 1965, 40/13,052
Int. Cl. H02h 3/28
U.S. Cl. 317—31                2 Claims

ABSTRACT OF THE DISCLOSURE

A D.C. transmission line connected in parallel to an A.C. transmission line including a rectifier at the sending terminal and an inverter at the receiving terminal to improve the stability of the complete system during a fault. The D.C. transmission line is normally in a stand-by relationship and upon the occurrence of a low voltage condition on the A.C. transmission line, the power output of the D.C. transmission line is greatly increased to stabilize the system. Upon cessation of the fault condition, the D.C. transmission line is returned to a stand-by condition through the operation of a switching means which is responsive to the absence of a fault condition.

---

The present invention relates to a control system for improving transient stability of A.C. system by joint use of D.C. system, and more particularly to such an improvement of an electric power system in which A.C. power is transmitted and supplied to demandant through an A.C. power system and a D.C. power system as that transient stability in the case of any fault of the A.C. system is remarkably improved.

In order to improve the system stability it has been proposed to connect an A.C. transmission line in parallel with a D.C. transmission line including a rectifier located at the sending terminal and an inverter located at the receiving terminal. While the stability of such an electric system at the time of a failure or fault can be increased by increasing the direct current or D.C. power flowing through the D.C. line, as the system voltage is decreased substantially, it is necessary to greatly increase the D.C. power under such a low voltage condition in order to stabilize the system.

As is well known in the art, D.C. voltage or power can be varied by varying the ignition angle or the phase angle of the rectifier. Thus, in order to provide an extremely large increase in the D.C. power at the time of a system failure or fault, it is necessary to use an expensive rectifier having a high short-time overload capacity. Furthermore, to control D.C. power over a wide range, it is necessary to use a complicated control device for the rectifier. Such a complicated control device has inherently low response speed which is, of course, undesirable.

Accordingly, it is an object of this invention to eliminate the above mentioned defects.

Briefly stated, the control system constructed in accordance with this invention comprises an A.C. system, a D.C. system interconnected with said A.C. system, said D.C. system including a serially connected rectifier and inverter, means to derive a control signal corresponding to the voltage of the point of interconnection between said D.C. and A.C. systems, and means responsive to said control signal to control said inverter to restrain decrease of D.C. power and to control said rectifier to increase the D.C. power upon occurrence of a fault.

When each of the rectifier and inverter is provided with a constant-current control device, a suitable limiter is associated with the control circuit of the inverter, whereby the phase angle thereof is controlled only when the D.C. current flowing through the D.C. system becomes smaller than a predetermined reference value. In this case said control signal is applied only to the rectifier, and a control line extending between the rectifier and inverter can be eliminated.

For a complete understanding of the invention, reference may be made to the following detailed description taken in conjunction with the accompanying drawings in which:

FIGS. 2, 3 and 4 are graphical representations showing results of experiment made on the model system shown in FIG. 1;

FIG. 5 is a block diagram of one embodiment of this invention; and

FIG. 6 is a block diagram of a modification of the system of this invention.

It is well known in the art to operate in parallel an A.C. system and a D.C. system and to improve the stability of the electric system by controlling the power flowing through the D.C. system whereby to suppress undesirable transient phenomena in the voltage, power, frequency and the like of the A.C. system. For example, in the case illustrated in the simplified diagram shown in FIG. 1a wherein a three-phase A.C. system and a D.C. system are connected in parallel across a three-phase alternator indicated by the A.C. source symbol, if it is assumed that a three-phase short circuit occurs at a point P in the A.C. system and that the power $Pd$ transmitted over the D.C. system is constant, the mechanical input of the alternator G will become excessive at an operational point $t_1$ as indicated in FIG. 1b, which represents the relationship between electric power and phase angle, because of the surplus power caused by the three-phase short circuit, whereby the alternator will accelerate and finally step-out.

Figure 1A:
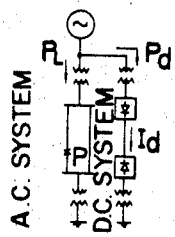
FIG. 1a is a simplified diagram of a model system comprising an A.C. system interconnected with a D.C. system.
Figure 1B:
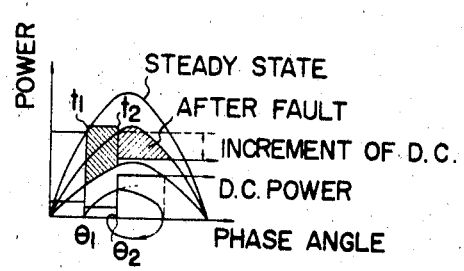
FIG. 1b is a graph showing the relationship between electric power and phase angle to explain the effect of the D.C. system upon improvement of the stability of the A.C. system.

In such a case, however, if a converter contained in the D.C. system were controlled so that an electric power of more than the excess mechanical input to the alternator G can be consumed by the D.C. system to provide a larger braking area than an accelerating area, as shown in FIG. 1b, then it would be possible to prevent the alternator G from stopping out and to transfer to a stable operating point $t_2$ after removal of the fault.

Figure 2:
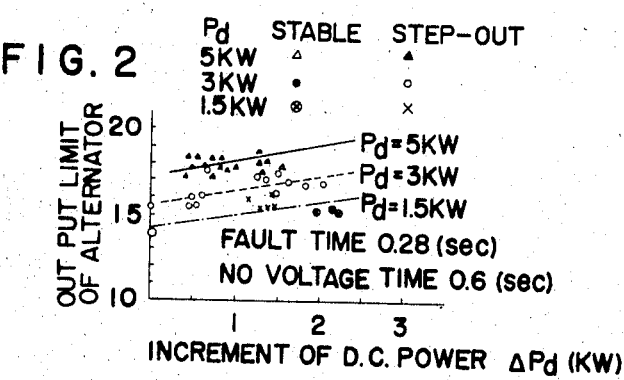
Figure 3:
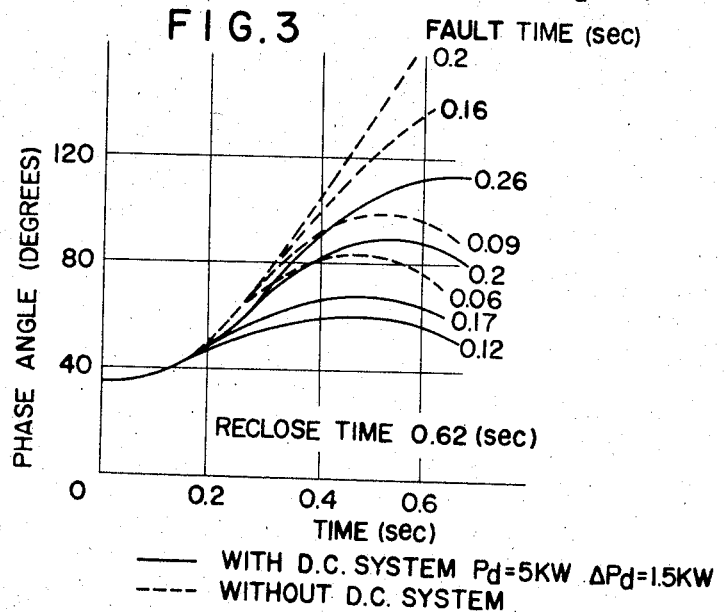

Results of tests made on a model transmission system as shown in FIG. 1a are shown in FIGS. 2 and 3. Wherein a three-phase short circuit was created at the middle of the A.C. system, and the control angle of a forward converter or rectifier included in the D.C. system was decreased simultaneously with interruption of the fault (no voltage time) whereby to increase the D.C. power, and the D.C. power being restored to the steady value simultaneously with circuit reclosure.

As is apparent from FIG. 2 which shows the relationship between increment of D.C. power $\Delta Pd$ and A.C. transient stability power limit, for example, if power increment $\Delta Pd = 1.5$ kw. when D.C. power $Pd = 5$ kw., it will be possible to increase the transient power stability by approximately 8.5%. Further, as is observable from FIG. 3 which shows the relationship between the fault time and the variation in the phase angle of the A.C. system, the A.C. system steps out when the duration of the fault exceeds 0.09 sec. when there is no interconnected D.C. system, whereas the A.C. system can be stabilized within 0.26 sec. by increasing the power through the interconnected D.C. system.

However, if the drop in alternating voltage caused by the occurrence of a 3-phase short circuit is greater than 40 percent, the input into the D.C. system becomes 20 percent. In this case, the D.C. system is operated with light load. Then problems brought about by minimum load operation may arise. The following improved method of control is therefore employed.

The merits of using a D.C. system, as compared to a constant shunt load as an antihunting device for the generator, are that it can keep the load effectively constant regardless of the terminal voltage of the generator; it can continuously regulate the capacity of the damping load; and it can, by the control of the D.C. power, abruptly nullify the effect of the disturbances in the A.C. system. This becomes more effective when the D.C. power drop caused by the 3-phase short circuit in the A.C. system is prevented since it prevents the acceleration of the generator.

In accordance with this invention, the above described difficulties are eliminated by controlling an inverter to prevent the D.C. power from decreasing upon occurrence of a fault and by controlling the rectifier so as to increase the D.C. power simultaneously with interruption of tne fault.

One example of the control device embodying the principle of this invention is shown in FIG. 5. As shown, an A.C. transmission line $L_A$ and a D.C. transmission line $L_D$ are converted in parallel between a sending end bus bar 10 and a receiving end bus bar 11. The D.C. transmission line $L_D$ includes suitable transformers $T_1$ and $T_2$, a rectifier $R_e$ and an invertor $I_n$ serially connected in the conventional manner. If desired, in order to operate the rectifier as a constant current rectifier, a suitable means 12 may be provided to compare the D.C. current flowing through the transmission line $L_D$ which is measured by means of a current transformer CT with a reference current $I_{do}$ to suitably control the control angle $\alpha$ of the rectifier via a suitable grid control device 13. The control angle $\beta$ of the inverter $I_n$ is normally controlled by a reference $\beta_0$ through a suitable grid control device 14.

In accordance with this invention the A.C. voltage of the sending end bus bar or at the point of interconnection between the A.C. and D.C. transmission lines is detected by a fault detector 16 through a potential transformer PT to control switches $S_1$ and $S_2$ associated with the control circuits 13 and 14, respectively, of the rectifier and inverter in the following manner.

The principle of the control system shown illustrated in FIG. 5 is as follows. When a fault occurs in the transmission line $L_A$ of the A.C. system, the fault is detected by drop of the alternating voltage $E_t$ at the junction. This detection is attained by a voltage drop detector 16, whereby a switch $S_1$ is closed thus to increase the control angle $\beta$ of the inverter $I_n$ by $\Delta\beta$. Thus, although the inverse voltage on the inverter side is decreased, the direct current reduction that would be caused by the alternating drop in voltage can be prevented. When the faulted A.C. circuit is opened, in a manner well known in the art, the switch $S_1$ is opened and the control angle $\beta$ is brought back to the previous value. At the same time as the opening of the switch $S_1$, the switch $S_2$ is simultaneously closed, whereby the control angle $\alpha$ of the rectifier $R_e$ is decreased. As a result, the D.C. voltage of rectifier $R_e$ is increased and the D.C. power also increases. When the A.C. transmission line $L_A$ is reclosed, the switch $S_2$ is opened and the D.C. power of rectifier $R_e$ is brought back to its previous value. Thus, it will be clear that while the decrease of D.C. output at the time of a fault is 40% of the normal value in the case of adopting no such control system according to this invention, said decrease can be limited within 15% with said control system, so that it is not necessary to greatly increase the D.C. power in the case of a fault in order to improve the transient stability. The above-mentioned 15% is a test result of the above described D.C. model system.

In the modification shown in FIG. 6 an A.C. transmission line $L_A$ and a D.C. transmission line $L_D$ in the form of a cable are connected in parallel between sending and receiving bus bars 10 and 11, via transformers $T_1$, $T_2$ and $T_3$, $T_4$, respectively. In this case both rectifier $R_e$ and inverter $I_n$ are provided with constant current control, and the reference value $I_{min}$ of the constant current control for the inverter is set to be less than the reference value $id$ for the rectifier by $\Delta id$ or $I_{min}=id-\Delta id$. Also, a limiter LIM is provided to prevent the constant current control for the inverter from operating under normal condition ($id>I_{min}$) but to cause the constant current control to operate only when a fault occurs or $I_d<I_{min}$.

When a fault occurs in the A.C. transmission line $L_A$, the voltage $E_t$ at the junction between the A.C. and D.C. transmission lines is detected by a fault detector 16 to close a switch S associated with the grid control circuit of the rectifier $R_e$ to increase the D.C. current. However, in the rectifier at a control angle $\alpha=0$, the constant current control becomes saturated to decrease the D.C. output current. Thus, $id<I_{min}$, and the control angle $\beta$ of the inverter is controlled. Thus, by selecting a suitable value of $I_{min}$, it is possible to limit to a minimum the decrease in the D.C. power at the time of a fault. Further, as the switch S has already been closed to energize the control circuit of the rectifier, the D.C. power is increased as soon as the fault is removed, and the saturation of the constant current control ceases.

Again, it is possible not only to decrease the amount of increase in the power but also to improve the stability of the system by increasing the response speed of the control system. In contrast to the embodiment shown in FIG. 5, since this modification does not require a control wire between the point of interconnection and the inverter, it is especially advantageous for use in long distance transmission lines.

As will be obvious from the foregoing description, in accordance with this invention, instead of increasing the D.C. power by controlling the rectifier alone in case of a failure, the inverter is controlled to restrain excessive decrease in the D.C. power, and then the rectifier is controlled to increase the D.C. power, thus making it possible to improve the stability of the A.C. system with less increase of the D.C. power. For this reason, it is possible to use economical converters with smaller short-time overload capacity. Further, as the control system has a quick response, it is effective for improving the stability of the power system.

While I have illustrated and described a specific form of apparatus embodying my invention, various other arrangements and applications will occur to those skilled in the art. I do not, therefore, desire my invention to be limited to the details of construction and specific arrangements disclosed, and I intend, by the appended claims, to cover all modifications which fall within the spirit and cope of my invention.

What I claim is:

1. In a power transmission system in which an A.C. power is transmitted and supplied to demandant through an A.C. power system and a D.C. power system which is interconnected in parallel with said A.C. power system in order to stabilize the transmission system when a fault occurs in the A.C. power system, said D.C. power system including a rectifier having a control circuit and located at the sending terminal of the transmission system and an inverter having a control circuit and located at a distance from said rectifier, the control system which comprises a fault detector responsive to the voltage of the power transmission system to produce a control signal, means responsive to said control signal to control said inverter so as to suppress decrease of D.C. power, and means responsive to said control signal to control said rectifier so as to increase the D.C. power.

2. In a power transmission system in which an A.C. power is transmitted and supplied to demandant through an A.C. power system and a D.C. power system which is interconnected in parallel with said A.C. power system in order to stabilize the transmission system when a fault occurs in the A.C. power system, said D.C. power system including a rectifier having a control circuit and located at the sending terminal of the transmission system and an inverter having a control circuit and located at a distance from said rectifier; the control system which comprises a fault detector responsive to the voltage of the power transmission system to produce a control signal, and means responsive to said control signal to control said rectifier so as to increase the D.C. power, said rectifier and inverter being respectively provided with constant current control devices and said inverter being provided with a current limiter associated with the control circuit of said inverter, whereby the phase angle thereof is controlled only when the D.C. current flowing through the D.C. transmission line of said D.C. power system becomes smaller than a predetermined reference value.

References Cited

UNITED STATES PATENTS

| | | | |
|---|---|---|---|
| 2,897,433 | 7/1959 | Putkovich et al. | 321—8 |
| 3,009,093 | 11/1961 | Seike | 321—8 |
| 3,293,530 | 12/1966 | Baude | 321—8 |

LEE T. HIX, *Primary Examiner.*

R. V. LUPO, *Assistant Examiner.*

U.S. Cl. X.R.

307—33, 86; 321—8